United States Patent
Liu et al.

(10) Patent No.: US 11,734,953 B2
(45) Date of Patent: Aug. 22, 2023

(54) IMAGE PARSING METHOD AND APPARATUS

(71) Applicant: Huawei Technologies Co., Ltd., Shenzhen (CN)

(72) Inventors: Ziluan Liu, Beijing (CN); Shuailin Lv, Beijing (CN); Yunchao Zhang, Beijing (CN); Chao Qin, Beijing (CN); Yao Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 17/298,380

(22) PCT Filed: Nov. 26, 2019

(86) PCT No.: PCT/CN2019/120842
§ 371 (c)(1),
(2) Date: May 28, 2021

(87) PCT Pub. No.: WO2020/108466
PCT Pub. Date: Jun. 4, 2020

(65) Prior Publication Data
US 2022/0058427 A1    Feb. 24, 2022

(30) Foreign Application Priority Data
Nov. 30, 2018    (CN) .................. 201811455917.5

(51) Int. Cl.
*G06V 40/16*    (2022.01)
*G06V 10/44*    (2022.01)
(Continued)

(52) U.S. Cl.
CPC .......... *G06V 40/168* (2022.01); *G06F 18/253* (2023.01); *G06T 3/0006* (2013.01);
(Continued)

(58) Field of Classification Search
None
See application file for complete search history.

(56) References Cited

U.S. PATENT DOCUMENTS

| | | | |
|---|---|---|---|
| 10,685,446 B2 * | 6/2020 | Fleishman | ........... H04N 13/261 |
| 2018/0137388 A1 | 5/2018 | Kim et al. | |
| 2019/0102605 A1 * | 4/2019 | Du | .................... G06F 18/24143 |

FOREIGN PATENT DOCUMENTS

| | | |
|---|---|---|
| CN | 107609536 A | 1/2018 |
| CN | 108062756 A | 5/2018 |

(Continued)

OTHER PUBLICATIONS

Liu, S., et al., "Face Parsing via Recurrent Propagation," arXiv:1708.01936v1 [cs.CV] Aug. 6, 2017, 13 pages.
(Continued)

*Primary Examiner* — Mohammed Rachedine
(74) *Attorney, Agent, or Firm* — Conley Rose, P.C.

(57) ABSTRACT

An image parsing method includes obtaining feature information of an initial image, parsing first feature information in the feature information using a first channel to obtain a first prediction result, parsing second feature information in the feature information using a second channel to obtain a second prediction result, where a size of the first feature information meets a first size range, a size of the second feature information meets a second size range, and the first size range is less than the second size range, and outputting the first prediction result and the second prediction result as a parsing result of the initial image.

20 Claims, 4 Drawing Sheets

(51) Int. Cl.
  *G06V 10/764* (2022.01)
  *G06V 10/80* (2022.01)
  *G06V 10/82* (2022.01)
  *G06T 3/00* (2006.01)
  *G06T 3/40* (2006.01)
  *G06F 18/25* (2023.01)

(52) U.S. Cl.
  CPC .............. *G06T 3/40* (2013.01); *G06V 10/454* (2022.01); *G06V 10/764* (2022.01); *G06V 10/809* (2022.01); *G06V 10/82* (2022.01); *G06V 40/171* (2022.01); *G06T 2207/30201* (2013.01)

(56) References Cited

FOREIGN PATENT DOCUMENTS

| | | | | |
|---|---|---|---|---|
| CN | 108090468 | A | 5/2018 | |
| CN | 108279820 | A | 7/2018 | |
| CN | 108287650 | A | 7/2018 | |
| CN | 108446694 | A | 8/2018 | |
| CN | 108536498 | A | 9/2018 | |
| CN | 108733298 | A | 11/2018 | |
| CN | 108830855 | A | 11/2018 | |
| CN | 113406077 | A * | 9/2021 | ............. C12Q 1/686 |
| CN | 114245125 | A * | 3/2022 | ........... H04N 13/161 |
| WO | WO-2018099473 | A1 * | 6/2018 | ......... G06K 9/00664 |
| WO | WO-2020077525 | A1 * | 4/2020 | |

OTHER PUBLICATIONS

Liu, S., et al., "Multi-Objective Convolutional Learning for Face Labeling," CVPR 2015 paper, 9 pages.

Zhao, H., et al., "Pyramid Scene Parsing Network," arXiv:1612. 01105v2 [cs.CV] Apr. 27, 2017, 11 pages.

Chen, L., et al, "Rethinking Atrous Convolution for Semantic Image Segmentation," arXiv:1706 05587v3 [cs.CV] Dec. 5, 2017, 14 pages.

Fuan, T., et al., "Atrous Faster R-CNN for Small Scale Object Detection," 2nd International Conference on Multimedia and Image Processing (ICMIP), IEEE, Mar. 17, 2017, 6 pages, XP033281713.

Zhou, Y., et al., "Interlinked Convolutional Neural Networks for Face Parsing," Nov. 19, 2015, Advances in Biometrics : International Conference, ICB 2007, Seoul, Korea, Aug. 27-29, 2007, Proceedings, Lecture Notes in Computer Science; Lect.Notes Computer, Springer, Berlin, Heidelberg, 10 pages, XP047342484.

Chen, L., et al., "Encoder-Decoder with Atrous Separable Convolution for Semantic Image Segmentation," In Proceedings of the European Conference on Computer Vision, Munich, Germany, Sep. 8-14, 2018, 19 pages, XP047488272.

* cited by examiner

IMAGE PARSING METHOD AND APPARATUS

CROSS-REFERENCE TO RELATED APPLICATIONS

This application is a U.S. National Stage of International Patent Application No. PCT/CN2019/120842 filed on Nov. 26, 2019, which claims priority to Chinese Patent Application No. 201811455917.5 filed on Nov. 30, 2018. Both of the aforementioned applications are hereby incorporated by reference in their entireties.

TECHNICAL FIELD

This application relates to the computer field, and in particular, to an image parsing method and apparatus.

BACKGROUND

With development of science and technology, facial recognition technologies are more and more popular in daily life, such as payment through facial recognition, and mobile phone screen unlocking through facial recognition. A basis of facial recognition is facial component parsing. Specifically, the facial component parsing is to perform recognition and decomposition on components such as five sense organs and hair based on a human head image. Specific parts include eyes, eyebrows, upper and lower lips, mouth, ears, face skin, hair, glasses, sunglasses, neck, and the like. Precision of the facial component parsing is closely related to a facial recognition method.

Currently, in most face parsing technologies, basic features of an input image are extracted based on a convolutional neural network, then the features are parsed by using more than two channels in different fields of view, and finally, a final parsing result is obtained by fusing parsing results. Consequently, this is easy to cause an excessively large volume and large occupied space of an image parsing model in an image parsing process.

SUMMARY

Embodiments of this application provide an image parsing method and apparatus, to reduce a volume of an image parsing model and improve image parsing efficiency and accuracy.

According to a first aspect, an embodiment of this application provides an image parsing method, specifically including: An image parsing apparatus obtains an initial image, and then extracts feature information of the initial image, the image parsing apparatus divides the feature information of the initial image into first feature information and second feature information based on a preset first size range and a preset second size range, where the first size range is less than the second size range; then, the image parsing apparatus parses the first feature information by using a first channel that matches the first feature information, to obtain a first prediction result, and parses the second feature information by using a second channel that matches the second feature information, to obtain a second prediction result; and finally, the image parsing apparatus uses the first prediction result and the second prediction result as a final parsing result of the initial image, and outputs the final parsing result.

In the technical solution provided in this embodiment, the image parsing apparatus reserves and outputs both the first parsing result and the second parsing result in a concatenate splicing mode.

According to the technical solution provided in the embodiment of this application, components in the initial image can be effectively classified and parsed, to improve parsing efficiency. In addition, parsing channels in an image parsing process are reduced, and parsing complexity is reduced, so that a volume of the image parsing model is reduced, and space occupied by the image parsing model is reduced.

Optionally, the image parsing apparatus may further adaptively adjust a field of view size of a channel based on a size of the feature information. In an example, the image parsing apparatus determines a field of view size of the first channel based on the first feature information, and determines a field of view size of the second channel based on the second feature information. To implement that adjustment of a field of view can be dynamically and continuously performed during model training, in this embodiment, a field of view size of each channel is adjusted by changing a feature map size. A specific implementation may be as follows:

The image parsing apparatus determines a feature map size of the first feature information and a feature map size of the second feature information. Subsequently, the image parsing apparatus adjusts the field of view size of the first channel based on the feature map size of the first feature information, and adjusts the field of view size of the second channel based on the feature map size of the second feature information. For example, a relatively small area (such as an eye, an eyebrow, or a lip) on a human face is selected to train an optimal field of view of the first channel corresponding to this area. Then, fields of view of subsequent convolutional layers are fixed, a training process is driven by data, and through calculation, an optimal field of view of the relatively small area is obtained. Similarly, for a relatively large area (such as hair, a nose, or an ear) on the human face, an optimal field of view of the second channel corresponding to this area may also be obtained through calculation by using a same method.

It may be understood that a portrait may be divided into a human face and a human body. Therefore, in different cases, the field of view of the first channel and the field of view of the second channel may be specifically defined as follows: When the image parsing apparatus recognizes the human face, the field of view of the first channel may be defined as 43×43, and the field of view of the second channel may be defined as 67×67. When the image parsing apparatus recognizes the human body, the field of view of the first channel may be defined as 59×59, and the field of view of the second channel may be defined as 83×83.

In this embodiment of this application, the field of view of the first channel and the field of view of the second channel are adaptively adjusted, so that accuracy of a feature parsing result can be effectively improved.

Optionally, that the image parsing apparatus obtains the feature information of the initial image may be specifically as follows: preprocessing the initial image to obtain a preprocessed image, where a format of the preprocessed image is preset; and obtaining feature information of the preprocessed image by using a preset convolutional layer, where the feature information is used as the feature information of the initial image.

It may be understood that when preprocessing the initial image, the image parsing apparatus may perform affine transform and/or scaling on the initial image to obtain the preprocessed image. To be specific, the image parsing apparatus performs calibration, data enhancement, and size scaling on the initial image, so that a specification of the initial image meets a format of a picture in a training process, to reduce difficulty in network learning. However, to enable the image parsing apparatus to be used in a handheld intelligent terminal such as a mobile phone or a tablet computer, a quantity of preset convolutional layers needs to be correspondingly reduced, and a quantity of convolution kernels also needs to be correspondingly reduced. In this embodiment, the image parsing apparatus may set the quantity of preset convolutional layers to five, and the quantities of convolution kernels are separately 64, 64, 128, 64, and 64.

According to a second aspect, an embodiment of this application provides an image parsing apparatus. The image parsing apparatus has a function of implementing behavior of the image parsing apparatus in the first aspect. The function may be implemented by hardware, or may be implemented by hardware executing corresponding software. The hardware or the software includes one or more modules corresponding to the foregoing function.

In a possible implementation, the image parsing apparatus includes units or modules configured to perform the steps in the first aspect. For example, the apparatus includes: an obtaining module, configured to obtain feature information of an initial image; a processing module, configured to parse first feature information in the feature information by using a first channel, to obtain a first prediction result, and parse second feature information in the feature information by using a second channel, to obtain a second prediction result, where a size of the first feature information meets a first size range, a size of the second feature information meets a second size range, and the first size range is less than the second size range; and an output module, configured to output the first prediction result and the second prediction result as a parsing result of the initial image.

Optionally, the apparatus further includes a storage module, configured to store program instructions and data that are necessary for the image parsing apparatus.

In a possible implementation, the apparatus includes a processor and a transceiver. The processor is configured to support the image parsing apparatus in performing the corresponding function in the method provided in the first aspect. Optionally, the apparatus may further include a memory. The memory is configured to couple to the processor, and stores program instructions and data that are necessary for the image parsing apparatus.

In a possible implementation, when the apparatus is a chip in the image parsing apparatus, the chip includes a processing module and an input/output module. The input/output module may be, for example, a transceiver. The transceiver obtains an initial image. The processing module may be, for example, a processor. The processor is configured to: obtain feature information of the initial image; and parse first feature information in the feature information by using a first channel, to obtain a first prediction result, and parse second feature information in the feature information by using a second channel, to obtain a second prediction result, where a size of the first feature information meets a first size range, a size of the second feature information meets a second size range, and the first size range is less than the second size range. The transceiver module may be, for example, an input/output interface, a pin, or a circuit on the chip, and may transmit, to another chip or module coupled to the chip, the first parsing result and the second parsing result that are obtained by the processor through parsing. The processing module may execute computer-executable instructions stored in a storage unit, to support the image parsing apparatus in performing the method provided in the first aspect. Optionally, the storage unit may be a storage unit in the chip, for example, a register or a cache. The storage unit may be alternatively a storage unit that is located outside the chip, for example, a read-only memory (read-only memory, ROM), or another type of static storage device that can store static information and instructions, or a random access memory (random access memory, RAM).

In a possible implementation, the apparatus includes a processor, a baseband circuit, a radio frequency circuit, and an antenna. The processor is configured to control a part of functions of each circuit. Optionally, the apparatus further includes a memory. The memory stores program instructions and data that are necessary for a base station.

The processor mentioned anywhere above may be a general-purpose central processing unit (Central Processing Unit, CPU), a microprocessor, an application-specific integrated circuit (application-specific integrated circuit, ASIC), or one or more integrated circuits configured to control program execution of the image parsing apparatuses in the foregoing aspects.

According to a third aspect, an embodiment of this application provides a computer-readable storage medium. The computer storage medium stores computer instructions, and the computer instructions are used to perform the method according to any possible implementation of the first aspect.

According to a fourth aspect, an embodiment of this application provides a computer program product including instructions. When the computer program product is run on a computer, the computer is enabled to perform the method according to any one of the foregoing aspects.

According to a fifth aspect, this application provides a chip system. The chip system includes a processor, configured to support an image parsing apparatus in implementing functions described in the foregoing aspects, for example, generating or processing data and/or information related to the foregoing method. In a possible design, the chip system further includes a memory. The memory is configured to store program instructions and data that are necessary for the image parsing apparatus, to implement functions in any one of the foregoing aspects. The chip system may include a chip, or may include a chip and another discrete component.

It can be learned from the foregoing technical solutions that the embodiments of this application have the following advantages: The image parsing apparatus divides the feature information of the initial image into the first feature information and the second feature information based on the preset first size range and the preset second size range, where the first size range is less than the second size range; parse the first feature information by using the first channel that matches the first feature information, to obtain the first prediction result, and parse the second feature information by using the second channel that matches the second feature information, to obtain the second prediction result; and finally use the first prediction result and the second prediction result as the parsing result of the initial image. In this way, each component in the initial image can be effectively classified and parsed, to improve parsing efficiency. In addition, parsing channels in an image parsing process are reduced, and parsing complexity is reduced, so that a volume of the image parsing model is reduced, and space occupied by the image parsing model is reduced.

DESCRIPTION OF EMBODIMENTS

Embodiments of this application provide an image parsing method and apparatus, to reduce a volume of an image parsing model and improve image parsing efficiency and accuracy.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper cases, so that the embodiments described herein can be implemented in other orders than the order illustrated or described herein. Moreover, the terms "include", "contain", and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, system, product, or device.

Figure 1:
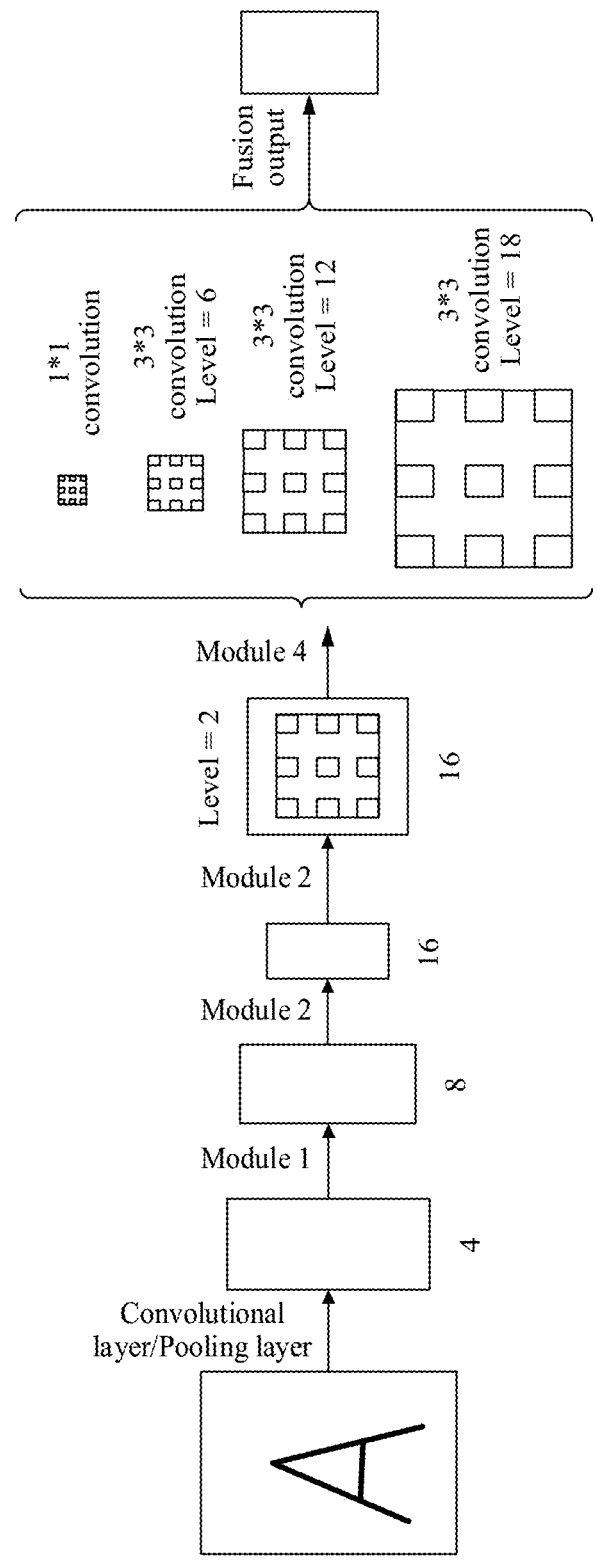
FIG. 1 is a flowchart of a current image parsing method.

With development of science and technology, facial recognition technologies are more and more popular in daily life, such as payment through facial recognition, and mobile phone screen unlocking through facial recognition. A basis of facial recognition is facial component parsing. Specifically, the facial component parsing is to perform recognition and decomposition on components such as five sense organs and hair based on a human head image. Specific parts include eyes, eyebrows, upper and lower lips, mouth, ears, face skin, hair, glasses, sunglasses, neck, and the like. Precision of the facial component parsing is closely related to a facial recognition method. As shown in FIG. 1, currently, in most face parsing technologies, basic features of an input image are extracted based on a convolutional neural network, then the features are parsed by using more than two channels in different fields of view, and finally, a final parsing result is obtained by fusing parsing results. Consequently, this is easy to cause an excessively large volume and large occupied space of an image parsing model in an image parsing process.

To resolve this problem, an embodiment of this application provides the following technical solution: The image parsing apparatus obtains an initial image, and then extracts feature information of the initial image. The image parsing apparatus divides the feature information of the initial image into first feature information and second feature information based on a preset first size range and a preset second size range, where the first size range is less than the second size range. Then, the image parsing apparatus parses the first feature information by using a first channel that matches the first feature information, to obtain a first prediction result, and parses the second feature information by using a second channel that matches the second feature information, to obtain a second prediction result. Finally, the image parsing apparatus uses the first prediction result and the second prediction result as a final parsing result of the initial image, and outputs the final parsing result.

Figure 2:
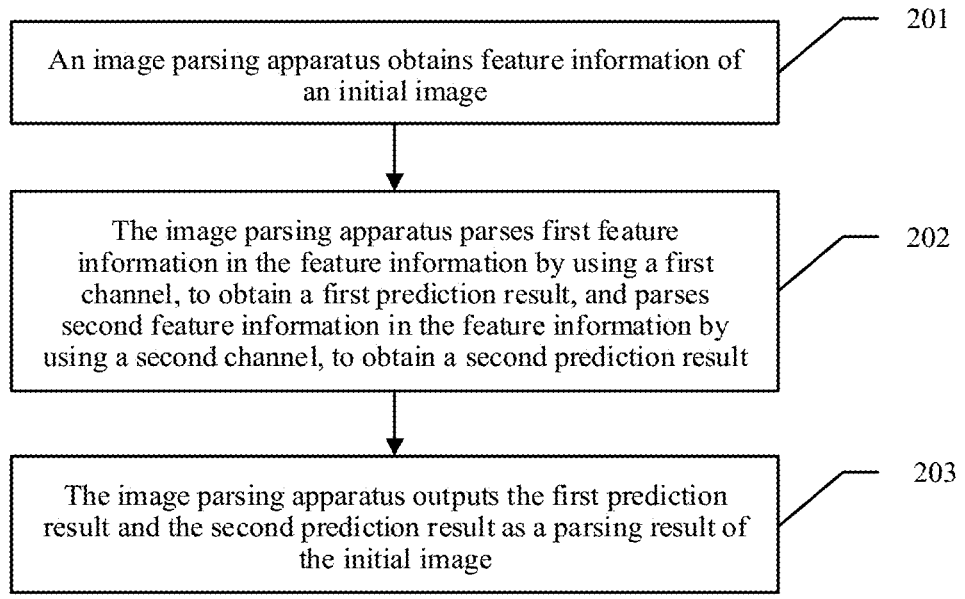
FIG. 2 is a schematic diagram of an embodiment of an image parsing method according to an embodiment of this application.

For a specific case, refer to FIG. 2. An embodiment of an image parsing method in the embodiments of this application includes the following steps.

201: The image parsing apparatus obtains feature information of the initial image.

The image parsing apparatus obtains the initial image, and then performs feature extraction on the initial image by using a preset convolutional layer, to obtain the feature information of the initial image.

To apply the image parsing method to an intelligent terminal such as a mobile phone, a quantity of preset convolutional layers and a quantity of convolution kernels need to be reduced. In this embodiment, the quantity of preset convolutional layers in the image parsing apparatus is 5, and quantities of convolution kernels are separately 64, 64, 128, 64, and 64.

Figure 3:
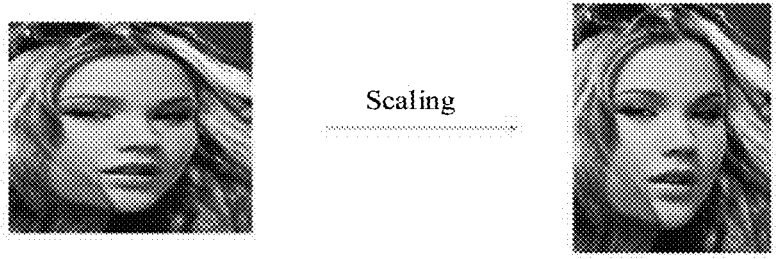
FIG. 3 is a schematic diagram of image transform according to an embodiment of this application.
Figure 4:
FIG. 4 is another schematic diagram of image transform according to an embodiment of this application.

Optionally, the image parsing apparatus may further preprocess the initial image through affine transform and/or scaling, to obtain a preprocessed image in a preset format. In this way, difficulty in network learning can be reduced. As shown in FIG. 3, the image parsing apparatus presets a size of the preprocessed image to 385×265, but a size of the input initial image is 400×400. In this case, the image parsing apparatus may scale the initial image to obtain the preprocessed image. As shown in FIG. 4, the image parsing apparatus presets that a front human face needs to be selected for the preprocessed image, but a human face in the input initial image is a side face. In this case, the image parsing apparatus performs affine transform on the initial image to obtain the front face. It may be understood that, when obtaining the preprocessed image of the initial image, the image parsing apparatus may alternatively use a manner such as a data augmentation manner, provided that a preprocessed image in a preset format can be obtained. A specific manner is not limited herein. In addition, the preset format may alternatively be another format, for example, without a shadow or with prominent facial features, and is not limited to the format used as an example in this embodiment.

202: The image parsing apparatus parses first feature information in the feature information by using a first channel, to obtain a first prediction result, and parses second feature information in the feature information by using a second channel, to obtain a second prediction result, where a size of the first feature information meets a first size range, a size of the second feature information meets a second size range, and the first size range is less than the second size range.

Facial features may be basically classified into two types in terms of a size, which are equivalent to the first feature information and the second feature information in this embodiment. The size of the first feature information is included in the first size range, the size of the second feature information is included in the second size range, and the first size range is less than the second size range. For example, the image parsing apparatus classifies small-size parts, such as eyes and eyebrows on a human face, into the first size range, and classifies large-size parts, such as the face and hair, into the second size range. The image parsing apparatus parses the first feature information by using the first channel, to obtain the first prediction result, and parses the second feature information by using the second channel, to obtain the second prediction result. This can effectively reduce model complexity and maintain relatively high recognition precision. Similarly, a human body may also be divided into two parts: a small-size part and a large-size part.

Optionally, when parsing the feature information by using the first channel and the second channel, the image parsing apparatus may further adaptively adjust respective field of view sizes. A specific operation is as follows. The image parsing apparatus determines a feature map size of the first feature information and a feature map size of the second feature information. Subsequently, the image parsing apparatus determines the field of view size of the first channel based on the feature map size of the first feature information, and determines the field of view size of the second channel based on the feature map size of the second feature information. It may be understood that a portrait may be divided into a human face and a human body. Therefore, in different cases, the field of view of the first channel and the field of view of the second channel may be specifically defined as follows; When the image parsing apparatus recognizes the human face, the field of view of the first channel may be defined as 43×43, and the field of view of the second channel may be defined as 67×67. When the image parsing apparatus recognizes the human body, the field of view of the first channel may be defined as 59×59, and the field of view of the second channel may be defined as 83×83.

203: The image parsing apparatus outputs the first prediction result and the second prediction result as a parsing result of the initial image.

The image parsing apparatus outputs the first prediction result and the second prediction result as the parsing result of the initial image. In this embodiment, the image parsing apparatus directly reserves both the first prediction result and the second prediction result, so that more feature information can be effectively reserved, and feature information of a part does not affect that of another part.

Figure 5:
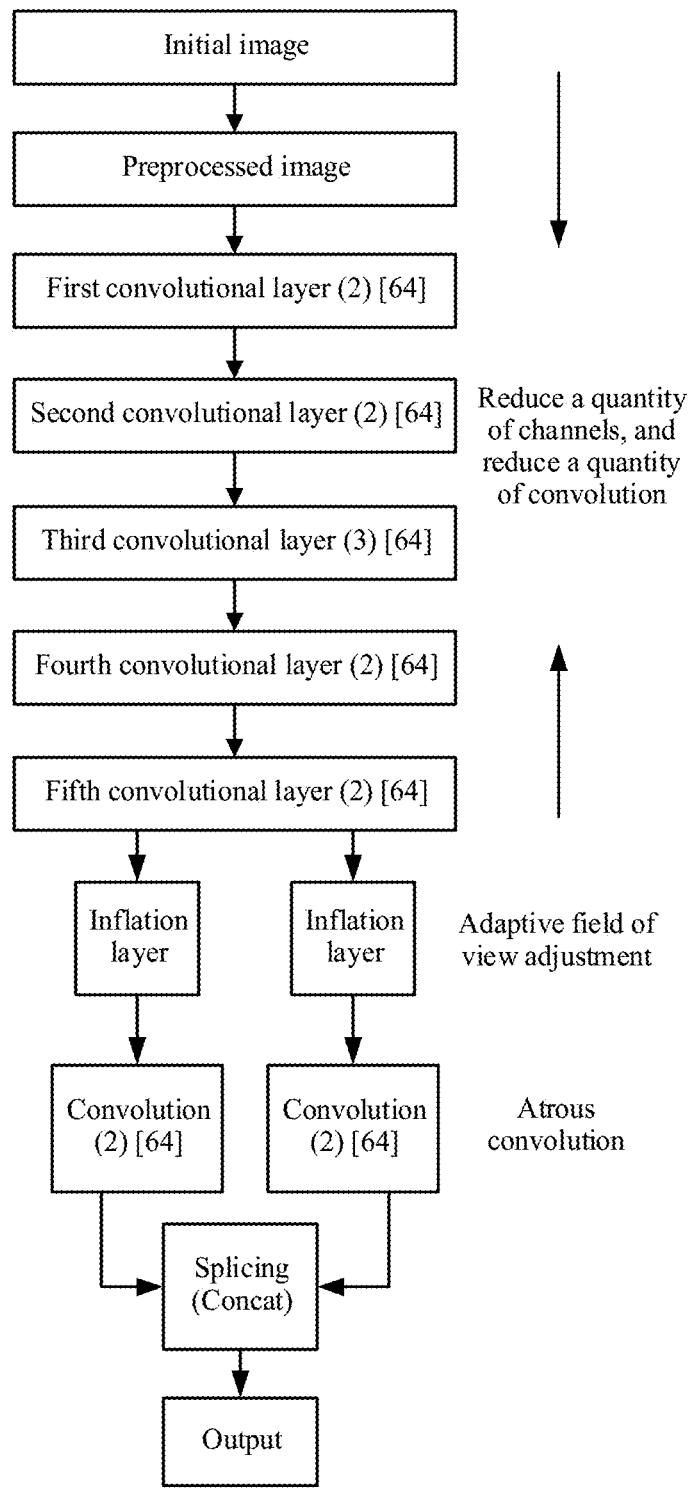
FIG. 5 is a schematic flowchart of image parsing according to an embodiment of this application.

Specifically, the image parsing process may be shown in FIG. 5. The image parsing apparatus obtains the initial image, and then processes the initial image by using a preprocessing module, to obtain the preprocessed image; performs feature extraction on the preprocessed image by using the convolutional layer, to obtain the feature information; determines the field of view size of the first channel and the field of view size of the second channel by using an inflation layer (inflation layer); parses the feature information of the preprocessed image by using an atrous convolutional layer, to obtain a corresponding prediction result: performs feature fusion on the prediction result in a Concat splicing manner; and finally outputs the parsing result.

In this embodiment, the image parsing apparatus can effectively classify and parse each component in the initial image, to improve parsing efficiency. In addition, parsing channels in an image parsing process are reduced, and parsing complexity is reduced, so that a volume of the image parsing model is reduced, and space occupied by the image parsing model is reduced. In addition, the fields of view of the two channels are adaptively adjusted, so that feature information of each component can be effectively reserved, and accuracy of feature parsing is improved.

The foregoing describes the image parsing method in the embodiments of this application. The following describes an image parsing apparatus in the embodiments of this application.

Figure 6:
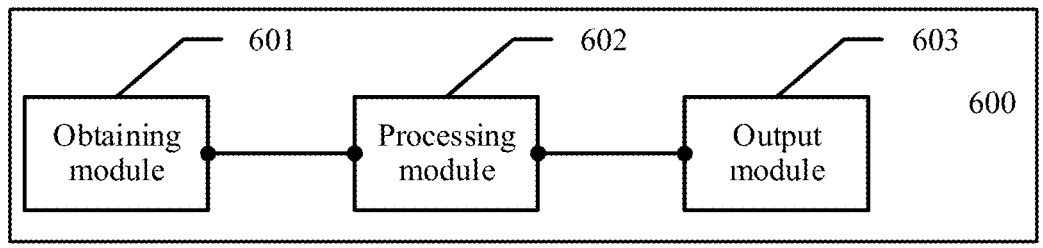
FIG. 6 is a schematic diagram of an embodiment of an image parsing apparatus according to an embodiment of this application.

Specifically, referring to FIG. 6, an image parsing apparatus 600 in the embodiments of this application includes: an obtaining module 601, a processing module 602, and an output module 603. The image parsing apparatus 600 may be a terminal, or may be one or more chips in a terminal. The image parsing apparatus 600 may be configured to perform a part or all of the steps in the foregoing method embodiments.

For example, the obtaining module 601 may be configured to perform step 201 in the foregoing method embodiment. The processing module 602 is configured to perform step 202 in the foregoing method embodiment. The output module 603 is configured to perform step 203 in the foregoing method embodiment. For example, the obtaining module 601 may obtain feature information of an initial image. The processing module 602 may parse first feature information in the feature information by using a first channel, to obtain a first prediction result, and parse second feature information in the feature information by using a second channel, to obtain a second prediction result. A size of the first feature information meets a first size range, a size of the second feature information meets a second size range, and the first size range is less than the second size range. The output module 603 may output the first prediction result and the second prediction result as a parsing result of the initial image.

Optionally, the image parsing apparatus 600 further includes a storage module. The storage module is coupled to the processing module, so that the processing module is enabled to execute computer-executable instructions stored in the storage module, to implement functions of the image parsing apparatus according to the foregoing method. In an example, the storage module optionally included in the image parsing apparatus 600 may be a storage unit in a chip, for example, a register or a cache. The storage module may be alternatively a storage unit that is located outside the chip, for example, a read-only memory (read-only memory, ROM), or another type of static storage device that can store static information and instructions, or a random access memory (random access memory, RAM).

It should be understood that a procedure executed by modules of the image parsing apparatus in the embodiment corresponding to FIG. 6 is similar to a procedure executed by the image parsing apparatus in the method embodiment corresponding to FIG. 2. Details are not described herein again.

Figure 7:
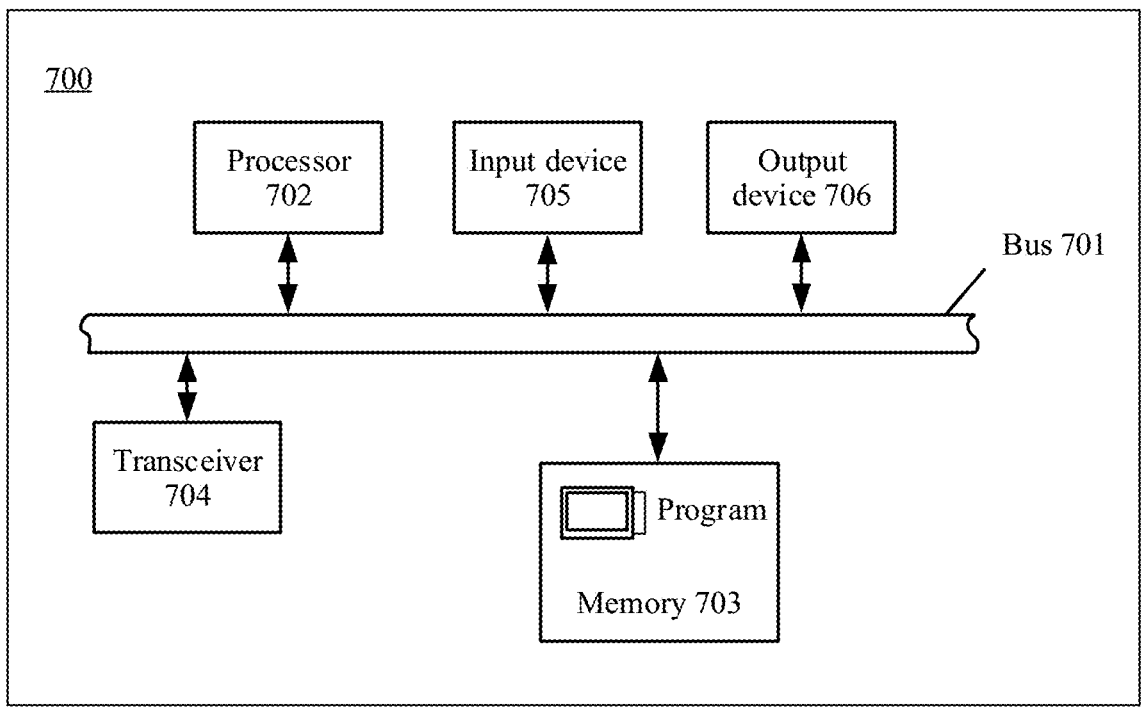
FIG. 7 is a schematic diagram of another embodiment of an image parsing apparatus according to an embodiment of this application.

FIG. 7 is a schematic diagram of a possible structure of an image parsing apparatus 700 according to the foregoing embodiments. The image parsing apparatus 700 may be configured as the foregoing image parsing apparatus. The apparatus 700 may include: a processor 702, a computer-readable storage medium/memory 703, a transceiver 704, an input device 705, an output device 706, and a bus 701. The processor, the transceiver, the computer-readable storage medium, and the like are connected by using the bus. A specific connection medium between the foregoing components is not limited in this embodiment of this application.

In an example, the transceiver 704 receives an initial image.

In an example, the processor 702 may include a baseband circuit, for example, preprocess the initial image, parse first feature information in the feature information by using a first channel, to obtain a first prediction result, and parse second feature information in the feature information by using a second channel, to obtain a second prediction result. A size of the first feature information meets a first size range, a size of the second feature information meets a second size range, and the first size range is less than the second size range.

In another example, the processor 702 may run an operating system to control a function between each device and each component. The transceiver 704 may include a baseband circuit and a radio frequency circuit.

The transceiver 704 and the processor 702 may implement corresponding steps in FIG. 2. Details are not described herein again.

It may be understood that FIG. 7 shows only a simplified design of an image parsing apparatus. During actual application, the image parsing apparatus may include any quantities of transceivers, processors, memories, and the like, and all image parsing apparatuses that can implement this application shall fall within the protection scope of this application.

The processor 702 in the image parsing apparatus 700 may be a general-purpose processor, for example, a general-purpose central processing unit (CPU), a network processor (network processor, NP), or a microprocessor, or may be an application-specific integrated circuit (application-specific integrated circuit, ASIC), or one or more integrated circuits configured to control program execution in the solutions of this application. Alternatively, the processor 702 may be a digital signal processor (digital signal processor, DSP), a field-programmable gate array (field-programmable gate array, FPGA), another programmable logic device, a discrete gate or a transistor logic device, or a discrete hardware component. Alternatively, the controller/processor may be a combination of processors implementing a computing function, for example, a combination of one or more microprocessors, or a combination of a DSP and a microprocessor. The processor usually performs logical and arithmetic operations based on program instructions stored in the memory.

The bus 701 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 7, but this does not mean that there is only one bus or only one type of bus.

The computer-readable storage medium/memory 703 may further store an operating system and another application program. Specifically, the program may include program code, and the program code includes computer operation instructions. More specifically, the memory may be a read-only memory (read-only memory, ROM), another type of static storage device that can store static information and instructions, a random access memory (random access memory, RAM), another type of dynamic storage device that can store information and instructions, a magnetic disk memory, or the like. The memory 703 may be a combination of the foregoing memories. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in a packaging material.

Alternatively, this embodiment of this application provides a universal processing system. For example, the universal processing system is usually referred to as a chip. The universal processing system includes one or more microprocessors that provide a processor function, and an external memory that provides at least a part of a storage medium. All these components are connected to other supporting circuits by using an external bus architecture. When instructions stored in a memory are executed by a processor, the processor is enabled to perform a part or all of the steps in the image parsing method of a base station in the embodiment in FIG. 2, for example, step 202 in FIG. 2 and/or another process used for the technology described in this application.

Method or algorithm steps described in combination with the content disclosed in this application may be implemented in a hardware manner, or may be implemented in a manner of executing software instructions by the processor. The software instructions may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, the storage medium is coupled to the processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Apart or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the current technology, or all or a part of the technical solutions may be implemented in the form of a software product. The software product is stored in a storage medium and includes several instructions for instructing a computer device (which may be a personal computer, a server, a network device or the like) to perform all or a part of the steps of the methods described in the embodiments of this application. The foregoing storage medium includes any medium that can store program code, for example, a USB flash drive, a removable hard disk, a read-only memory (ROM, Read-Only Memory), a random access memory (RAM, Random Access Memory), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method comprising:
   obtaining feature information of an initial image;
   parsing first feature information in the feature information using a first channel to obtain a first prediction result, wherein a first size of the first feature information meets a first size range;
   parsing second feature information in the feature information using a second channel to obtain a second prediction result, wherein a second size of the second feature information meets a second size range, and wherein the first size range is less than the second size range; and
   outputting the first prediction result and the second prediction result as a parsing result of the initial image.

2. The method of claim 1, further comprising:
   determining a first field of view size of the first channel based on the first feature information; and
   determining a second field of view size of the second channel based on the second feature information.

3. The method of claim 2, further comprising:
   determining a first feature map size of the first feature information;
   determining a second feature map size of the second feature information;
   further determining the first field of view size based on the first feature map size; and
   further determining the second field of view size based on the second feature map size.

4. The method of claim 2, wherein the first field of view size is either 43×43 or 59×59, and wherein the second field of view size is either 67×67 or 83×83.

5. The method of claim 1, further comprising:
   preprocessing the initial image to obtain a preprocessed image, wherein a format of the preprocessed image is preset;
   obtaining third feature information of the preprocessed image using a preset convolutional layer; and
   setting the third feature information as the feature information.

6. The method of claim 5, further comprising performing affine transform and scaling on the initial image to obtain the preprocessed image.

7. The method of claim 5, further comprising performing affine transform on the initial image to obtain the preprocessed image.

8. The method of claim 5, further comprising performing scaling on the initial image to obtain the preprocessed image.

9. An apparatus comprising:
   a memory configured to store a computer-readable program; and
   a processor coupled to the memory, wherein the computer-readable program causes the processor to be configured to:
      obtain feature information of an initial image;
      parse first feature information in the feature information using a first channel to obtain a first prediction result, wherein a first size of the first feature information meets a first size range;
      parse second feature information in the feature information using a second channel to obtain a second prediction result, wherein a second size of the second feature information meets a second size range, and wherein the first size range is less than the second size range; and
      output the first prediction result and the second prediction result as a parsing result of the initial image.

10. The apparatus of claim 9, wherein the computer-readable program further causes the processor to be configured to:
    determine a first field of view size of the first channel based on the first feature information; and
    determine a second field of view size of the second channel based on the second feature information.

11. The apparatus of claim 10, wherein the computer-readable program further causes the processor to be configured to:
    determine a first feature map size of the first feature information;
    determine a second feature map size of the second feature information;
    further determine the first field of view size based on the first feature map size; and
    further determine the second field of view size based on the second feature map size.

12. The apparatus of claim 10, wherein the first field of view size is either 43×43 or 59×59, and wherein the second field of view size is either 67×67 or 83×83.

13. The apparatus of claim 9, wherein the computer-readable program further causes the processor to be configured to:
    preprocess the initial image to obtain a preprocessed image, wherein a format of the preprocessed image is preset;
    obtain third feature information of the preprocessed image using a preset convolutional layer; and
    set the third feature information as the feature information.

14. The apparatus of claim 13, wherein the computer-readable program further causes the processor to be configured to:
    perform affine transform on the initial image to obtain the preprocessed image; or
    perform scaling on the initial image to obtain the preprocessed image.

15. A computer program product comprising computer-executable instructions stored on a non-transitory computer-readable storage medium that, when executed by a processor, cause an apparatus to:
- obtain feature information of an initial image;
- parse first feature information in the feature information using a first channel to obtain a first prediction result, wherein a first size of the first feature information meets a first size range;
- parse second feature information in the feature information using a second channel to obtain a second prediction result, wherein a second size of the second feature information meets a second size range, and wherein the first size range is less than the second size range; and
- output the first prediction result and the second prediction result as a parsing result of the initial image.

16. The computer program product of claim 15, wherein the computer-executable instructions further cause the apparatus to:
- determine a first field of view size of the first channel based on the first feature information; and
- determine a second field of view size of the second channel based on the second feature information.

17. The computer program product of claim 16, wherein the computer-executable instructions further cause the apparatus to:
- determine a first feature map size of the first feature information;
- determine a second feature map size of the second feature information;
- further determine the first field of view size based on the first feature map size; and
- further determine the second field of view size based on the second feature map size.

18. The computer program product of claim 16, wherein the first field of view size is either 43×43 or 59×59, and wherein the second field of view size is either 67×67 or 83×83.

19. The computer program product of claim 15, wherein the computer-executable instructions further cause the apparatus to:
- preprocess the initial image to obtain a preprocessed image, wherein a format of the preprocessed image is preset;
- obtain third feature information of the preprocessed image using a preset convolutional layer; and
- set the third feature information as the feature information.

20. The computer program product of claim 19, wherein the computer-executable instructions further cause the apparatus to:
- perform affine transform on the initial image to obtain the preprocessed image; or
- perform scaling on the initial image to obtain the preprocessed image.

* * * * *